United States Patent
Lounsbury

(10) Patent No.: US 10,273,082 B2
(45) Date of Patent: Apr. 30, 2019

(54) ATTACHABLE STABILIZER FOR LATERALLY SUPPORTING A GARBAGE BIN

(71) Applicant: Peter Alden Lounsbury, Bainbridge Island, WA (US)

(72) Inventor: Peter Alden Lounsbury, Bainbridge Island, WA (US)

(*) Notice: Subject to any disclaimer, the term of this patent is extended or adjusted under 35 U.S.C. 154(b) by 0 days.

(21) Appl. No.: 15/839,535

(22) Filed: Dec. 12, 2017

(65) Prior Publication Data
US 2019/0002198 A1  Jan. 3, 2019

Related U.S. Application Data

(60) Provisional application No. 62/527,651, filed on Jun. 30, 2017.

(51) Int. Cl.
*B60B 33/00* (2006.01)
*B65F 1/14* (2006.01)

(52) U.S. Cl.
CPC ........ *B65F 1/1468* (2013.01); *B60B 33/0002* (2013.01); *B60B 33/0039* (2013.01)

(58) Field of Classification Search
CPC ..... Y10T 16/19; Y10T 16/191; Y10T 16/193; Y10T 16/1943; B65F 1/1468; B65F 1/1473; B60B 33/0002; B60B 33/001; B60B 33/0013; B60B 3/0018; B60B 3/0023; B60B 3/0039; B62B 2202/20; B62B 5/0083; B62B 5/0089
See application file for complete search history.

(56) References Cited

U.S. PATENT DOCUMENTS

| | | | | | |
|---|---|---|---|---|---|
| 536,629 | A | * | 4/1895 | Hvass | B62B 3/04 254/3 R |
| 2,521,819 | A | * | 9/1950 | Baer | B62B 3/04 16/30 |
| 2,818,271 | A | * | 12/1957 | Saeli | B62B 5/0083 248/129 |
| 2,890,061 | A | * | 6/1959 | Watson | A63B 55/60 280/47.26 |
| 3,452,380 | A | * | 7/1969 | Walther | A47L 11/4072 15/49.1 |
| 3,463,505 | A | * | 8/1969 | Chervitz | B60B 33/0002 16/30 |
| 3,734,527 | A | * | 5/1973 | Bard | B62B 5/0083 280/79.5 |

(Continued)

*Primary Examiner* — Chuck Y Mah

(57) ABSTRACT

An attachable stabilizer for laterally supporting a garbage bin balances the garbage bin as it is being pushed or pulled by the user. The attachable stabilizer includes a clevis, an extension plate, a garbage-bin coupler, a wheel, and an axle. The clevis affixes the wheel onto the extension plate in a steerable manner, thereby allowing the wheel to steer when the garbage bin makes a turn. The extension plate rotatably and laterally supports the garbage bin from tipping over. The garbage-bin coupler releasably couples the extension plate onto the wheel-and-axle assembly. As such, the extension plate may be retrofitted onto a variety of different garbage bins. The wheel and the axle along with the wheel-and-axle assembly allows the garbage bin to roll over the terrain. This allows the user to easily transport the garbage bin even if it is heavily loaded with waste.

18 Claims, 6 Drawing Sheets

(56) References Cited

U.S. PATENT DOCUMENTS

| | | | | | |
|---|---|---|---|---|---|
| 4,135,725 | A | * | 1/1979 | DiRoma | B62B 5/0083 16/30 |
| 4,226,434 | A | * | 10/1980 | Hill | B62B 1/12 280/47.21 |
| 4,331,343 | A | * | 5/1982 | Groth | B60B 33/0021 280/268 |
| 4,799,699 | A | * | 1/1989 | Berfield | B62B 3/104 15/323 |
| D362,326 | S | * | 9/1995 | Stout | D34/18 |
| 5,816,591 | A | * | 10/1998 | Parker | B65F 1/1468 280/47.34 |
| 5,873,145 | A | * | 2/1999 | Chou | A45C 5/14 16/44 |
| 5,924,705 | A | * | 7/1999 | Kubelka | A63C 17/22 280/11.19 |
| 6,279,705 | B1 | * | 8/2001 | Wu | A45C 5/14 190/115 |
| 6,688,614 | B2 | * | 2/2004 | Hsu | A45C 5/146 280/37 |
| 6,961,976 | B2 | * | 11/2005 | Kuo | A45C 5/145 16/18 R |
| 7,575,246 | B1 | * | 8/2009 | Lunski | B62B 1/002 220/630 |
| 8,973,927 | B2 | * | 3/2015 | Belanger | B62B 3/0643 280/47.17 |
| 9,221,301 | B1 | * | 12/2015 | Pastore | B60B 33/02 |
| 9,371,181 | B2 | * | 6/2016 | Connor | B65F 1/122 |
| 9,738,444 | B1 | * | 8/2017 | Uffner | B65F 1/1473 |
| 9,937,944 | B2 | * | 4/2018 | Anderson | B62B 5/00 |
| 2001/0049823 | A1 | * | 12/2001 | Matey | H04N 5/44543 725/39 |
| 2015/0237802 | A1 | * | 8/2015 | Bucharzewski | B60B 33/0015 16/18 R |

* cited by examiner

ATTACHABLE STABILIZER FOR LATERALLY SUPPORTING A GARBAGE BIN

The current application claims a priority to the U.S. Provisional Patent application Ser. No. 62/527,651 filed on Jun. 30, 2017.

FIELD OF THE INVENTION

The present invention generally relates to an attachable stabilizer for laterally supporting a garbage bin. More specifically, the attachable stabilizer positions the center of gravity of a wheeled garbage bin in line with the wheel-and-axle assembly.

BACKGROUND OF THE INVENTION

The purpose of having wheels on a garbage bin is to allow users to easily roll the garbage bin out to the curb for the garbage trucks to pick up the garbage bin. Some households produce a large amount of garbage due to a variety of reasons such as a large amount of household members that reside in the home or a large event. Many garbage bins are large enough to fit more than two regular sized trash bags in. Depending on the density of each trash bag, the garbage bin can become extremely heavy. Attempting to lift or drag a garbage bin without wheels is an inefficient method of transporting the garbage bin from one location to another location. Attempting to lift or drag a garbage bin can additionally pose a health hazard unto people who attempt to do so without proper form and cause unnecessary additional stress on a person's body. Most garbage bins use a wheel-and-axle assembly to help users move the garbage bin without having to lift it. The simple addition of wheels allows the user to tilt the large garbage bin at any varying angle in order to push or pull the garbage bin out to curb. The added wheels lessen the burden that a person would need to carry in order to transport the garbage bin from one point to another.

In some cases, the addition of wheels can make a garbage bin less stable. When the garbage bin is too heavy or the weight of the garbage placed inside is unevenly distributed, the garbage bin may be prone to easily tipping over. There have been some inventions that have added an additional third wheel to help the ease the transportation of a heavy garbage bin. But these inventions place the additional third wheel onto the side opposite that of where the wheels are located on the garbage bin. These inventions do not address the issue of adding stability to the wheel side of the garbage bin, which is where many garbage bins lose stability. Adding a third wheel to the wheel side of the garbage bin will help the user transport the garbage bin with more stability due to the added supporting member. Some inventions similar to this exist in which a mechanism for a third wheel is attached to the same side in which the existing wheels are. A third wheel attachment in previous inventions are detachable but these inventions often require a secure means of attaching the mechanism with methods that include the need to screw onto the existing base. Doing so may damage the garbage bin which in many cases is rented to the user by the public waste disposal department. Additionally, screwing on an attachment to the back of a garbage bin requires the use of a number of tools and may also add unnecessary holes into the garbage bin. In addition to these issues, these inventions may increase the chances of mistakes, especially if the invention is an aftermarket product.

The present invention is an attachable third wheel that attaches to the existing axle of the garbage bin. An objective of this present invention is to provide a simple, tool free means of attaching a third wheel onto a garbage bin for additional support and stability. The third wheel attachment that does not require any means of securing or the use of additional tools. This third wheel attachment is easily attachable and removable. The removability of this third wheel attachment allows the user to easily detach the third wheel attachment at will. When the garbage bin is not as heavy, the user is able to simply detach the third wheel attachment for use at a later time. Further, this allows the user to use the present invention with multiple garbage bins. The third wheel attachment contains an axle connector that allows the user to easily place the axle connector onto the existing axle of the garbage bin. The axle connector is not fixed into a single position on the axle. Instead, the existing axle of the garbage bin is free to rotate about the axle connector in which the remainder of the attachment allows for such movement. Because the third wheel attachment is positioned upon the axis of the existing wheels of the garbage bin and is additionally rotatable about the axis, the user is able to tilt and support the garbage bin with the third wheel attachment at the user's desired angle. This third wheel attachment can easily be used as an aftermarket product with any garbage bin due to the fact that this third wheel attachment can easily be snapped onto an existing axle. The user is additionally able to rest the back of the garbage bin on the third wheel attachment when rolling the garbage bin out. When the garbage bin is tilted, the user may be able to tilt it at such an angle where the garbage bin will then be rolling on a set of three wheels instead of two wheels. Being able to roll a heavy garbage bin on a set of three wheels instead of two can provide additional stability and a lessened burden when transporting the garbage bin from one point to another.

SUMMARY OF THE INVENTION

The present invention is a third wheel attachment for garbage bins with wheels. The third wheel attachment is easily snapped onto the existing axle of the garbage bin. This allows the user to attach and detach the third wheel attachment at will and according the user's desire. The user is able to tilt the garbage bin when transporting the garbage bin from one point to another with the added stability of an additional third wheel in addition to allowing the garbage bin to rest on the third wheel attachment. This third wheel attachment is universal such that the third wheel attachment can be used with any garbage bin with wheels.

DETAILED DESCRIPTION OF THE INVENTION

All illustrations of the drawings are for the purpose of describing selected versions of the present invention and are not intended to limit the scope of the present invention.

Conventional garbage bins comprise a wheel-and-axle assembly mounted offset from the center of gravity allowing a user to easily transport the garbage bin. To move the garbage bin, a user simply tilts the garbage bin until the center of gravity aligns to the wheel-and-axle assembly and rolls the garbage bin. This allows the user to balance on a single wheel-and-axle assembly. Accordingly, the present invention is an attachable stabilizer for laterally supporting a garbage bin. More specifically, the present invention secures the garbage bin in a perfectly balanced position.

Figure 1:
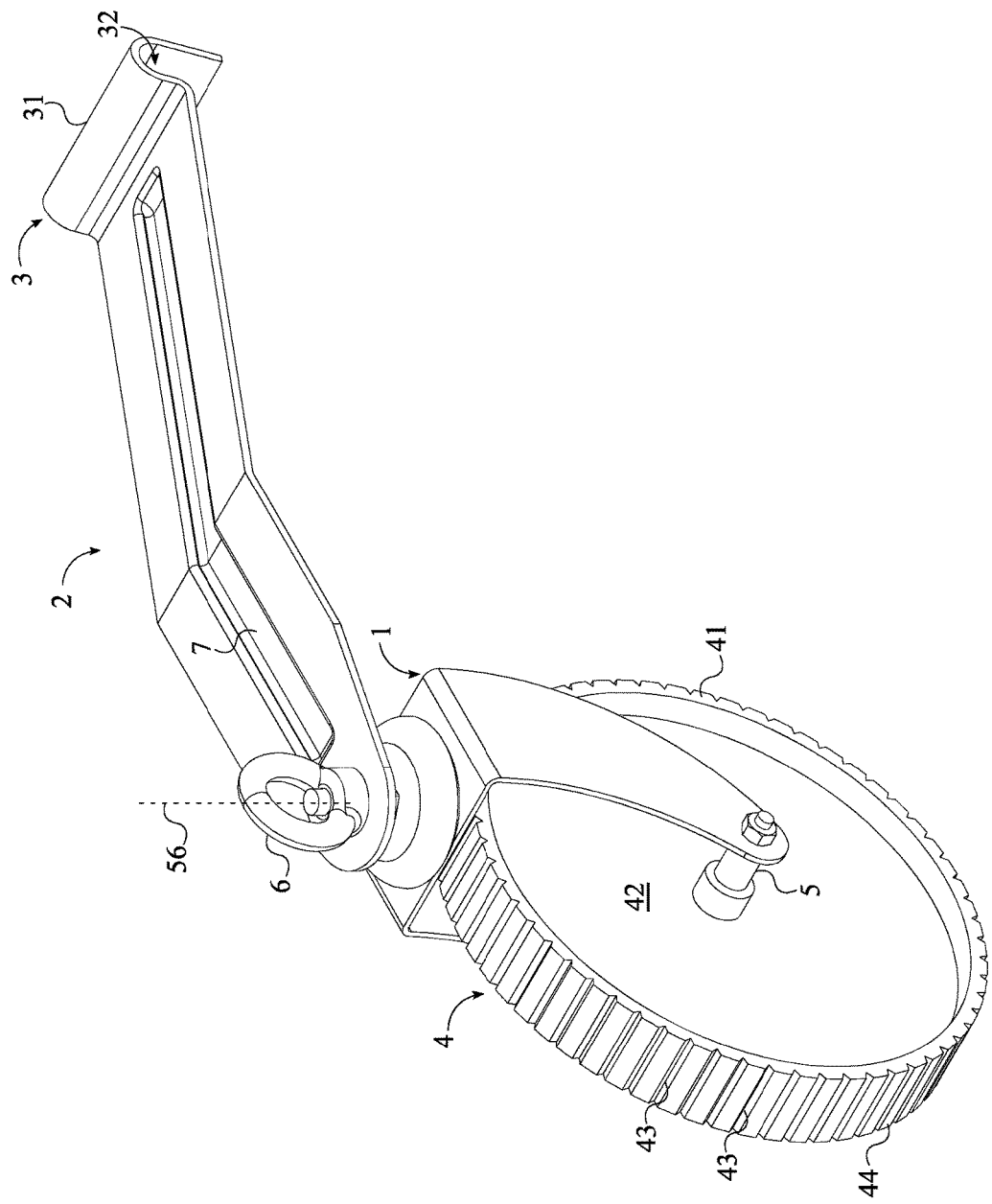
FIG. 1 is a rear perspective view of the present invention.
Figure 2:
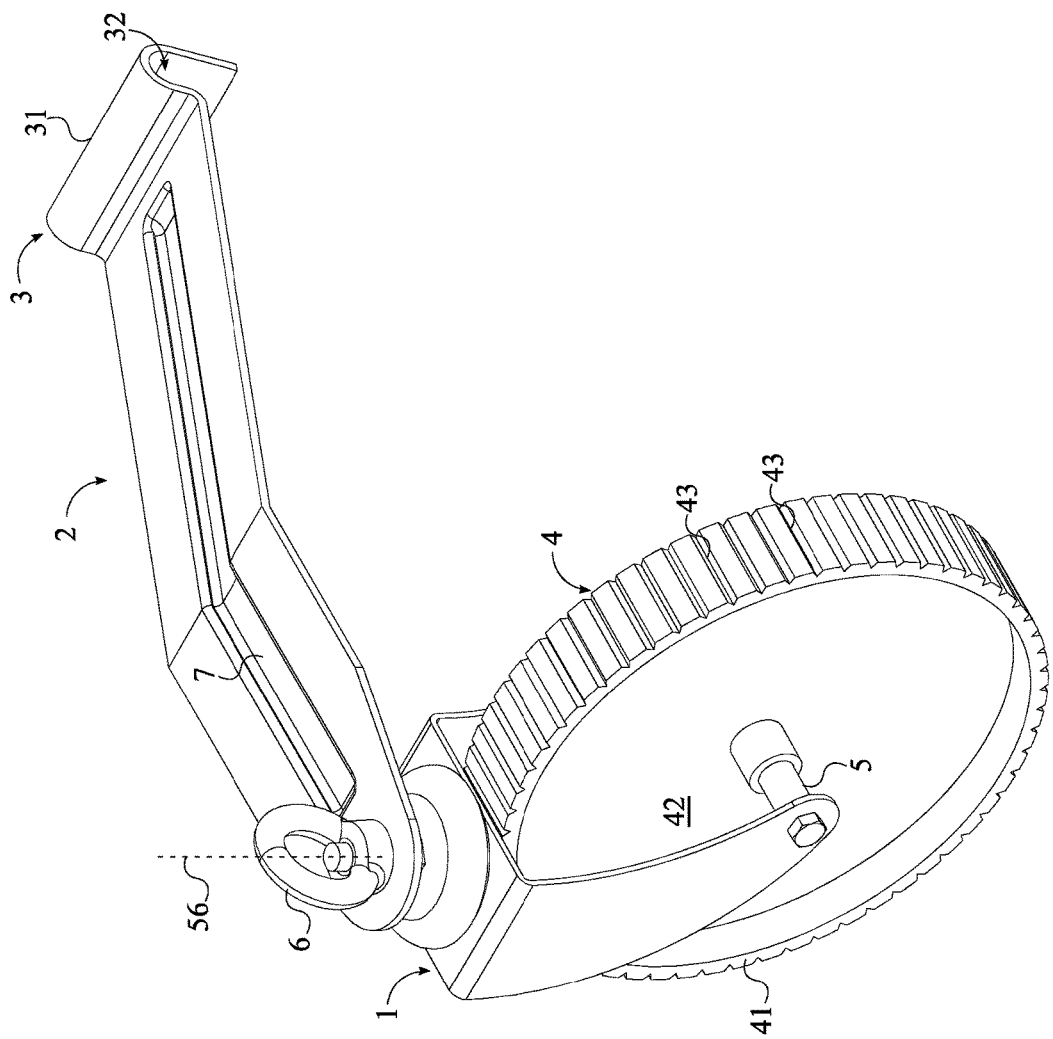
FIG. 2 shows a rear perspective view present invention with the wheel and the axle pivoting about the pivot axis.

Referring to FIG. 1, the preferred embodiment of the present invention comprises a clevis 1, an extension plate 2, a garbage-bin coupler 3, a wheel 41, and an axle 5. The extension plate 2 fastens the wheel 41 and axle 5 to the garbage bin, via the garbage-bin coupler 3. The wheel 41 and the axle 5 works in conjunction with the wheel-and-axle assembly to allow the garbage bin to roll freely on the ground. The clevis 1 provides a simple steering mechanism for steering the wheel 41 and the axle 5 when the garbage bin makes a turn. As such, the wheel 41 is positioned into the clevis 1. More specifically, the wheel 41 is rotatably mounted to the clevis 1 by the axle 5. As well as providing a steering mechanism, the clevis 1 also ensures the wheel 41 remains aligned in the proper position. The clevis 1 is terminally positioned to the extension plate 2. A hole made into the extension plate 2 accepts a threaded stem. The threaded stem is torsionally connected to a swivel head which is pivotally connected to the clevis 1. As such, the swivel head allows the clevis 1 to pivotally attach to the extension plate 2 about a pivot axis 56. In particular, the swivel head allows the clevis 1 to pivot while keeping the threaded stem static in relation to the extension plate 2. The pivot axis 56 is the axis about which the wheel 41 and axle 5 rotate when the garbage bin takes a turn. In the preferred embodiment, the pivot axis 56 is aligned parallel to the threaded stem. This positions the pivot axis 56 perpendicular to the axle 5. The garbage-bin coupler 3 is terminally attached to the extension plate 2, opposite to the clevis 1. The garbage-bin coupler 3 selectively couples the extension plate 2, the wheel 41, and, the axle 5 to the wheel-and-axle assembly of the garbage bin. To ensure that the wheel 41 maintains contact with the ground, the garbage-bin coupler 3 is configured to allow the extension plate 2 to rotate about the wheel-and-axle assembly.

Figure 3:
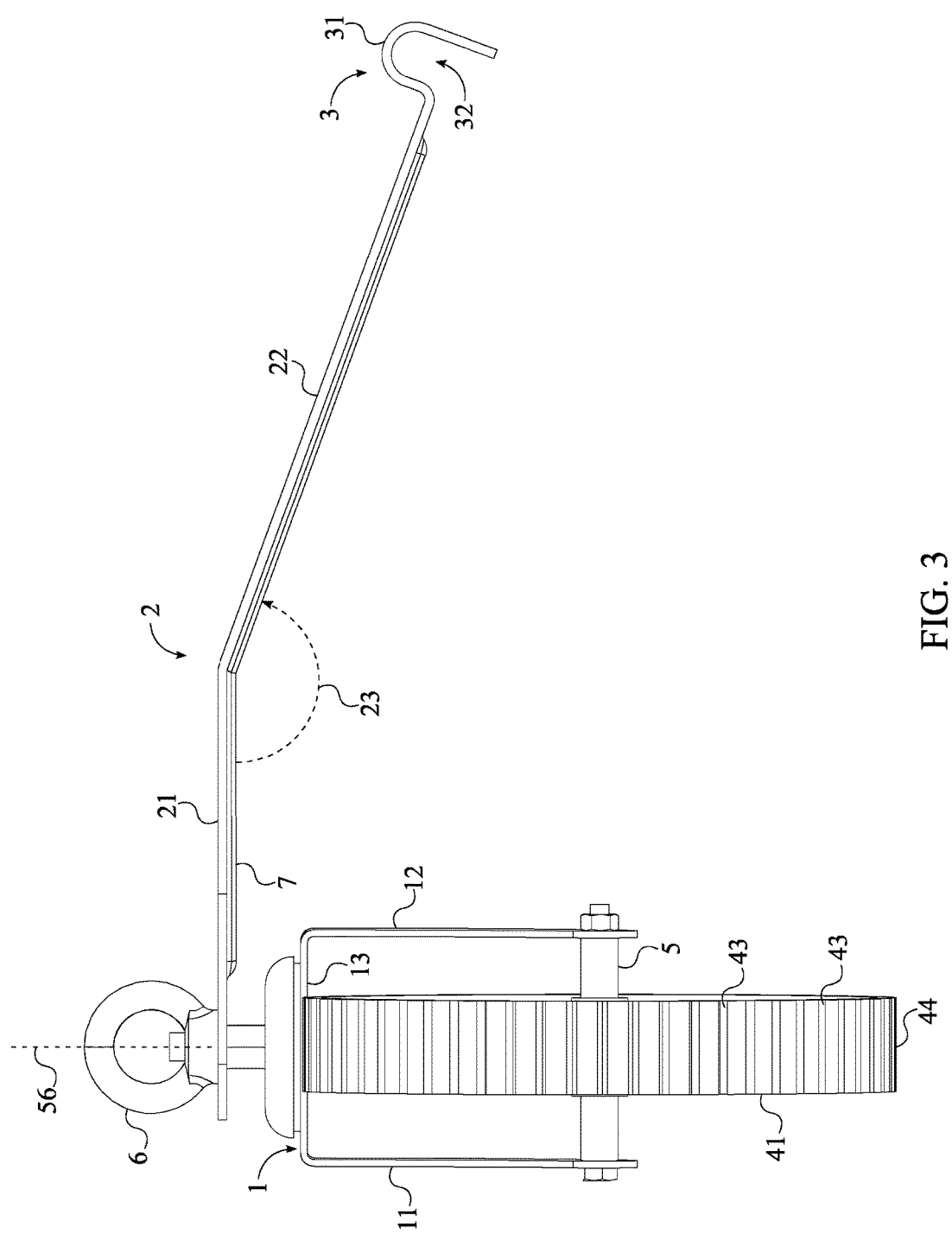
FIG. 3 is a side view of the present invention showing the wheel and the axle pivoting about the pivot axis.

Focusing now on the clevis 1, FIG. 3 shows the preferred embodiment of the clevis 1. The preferred clevis 1 comprises a first sidewall 11, a second sidewall 12, and a bridge 13. The first sidewall 11, the second sidewall 12, and the bridge 13 are arranged into a U-shaped structure that partially encloses the wheel 41 and the axle 5. The first sidewall 11 and the second sidewall 12 are positioned parallel and offset from each other. The bridge 13 is connected between the first sidewall 11 and the second sidewall 12. The axle 5 is attached in between the first sidewall 11 and second sidewall 12. This positions the bridge 13 and the axle 5 offset from each other along the clevis 1 thereby creating a recess which houses the wheel 41. The swivel head is laterally and rotatably mounted on to the bridge 13. The threaded stem inserts into the hole in the extension plate 2. Once inserted, a nut is screwed onto the threaded stem to prevent the swivel head separating from the extension plate 2. As a result, the extension plate 2 is centrally and pivotally attached to the bridge 13 about the pivot axis 56.

Figure 6:
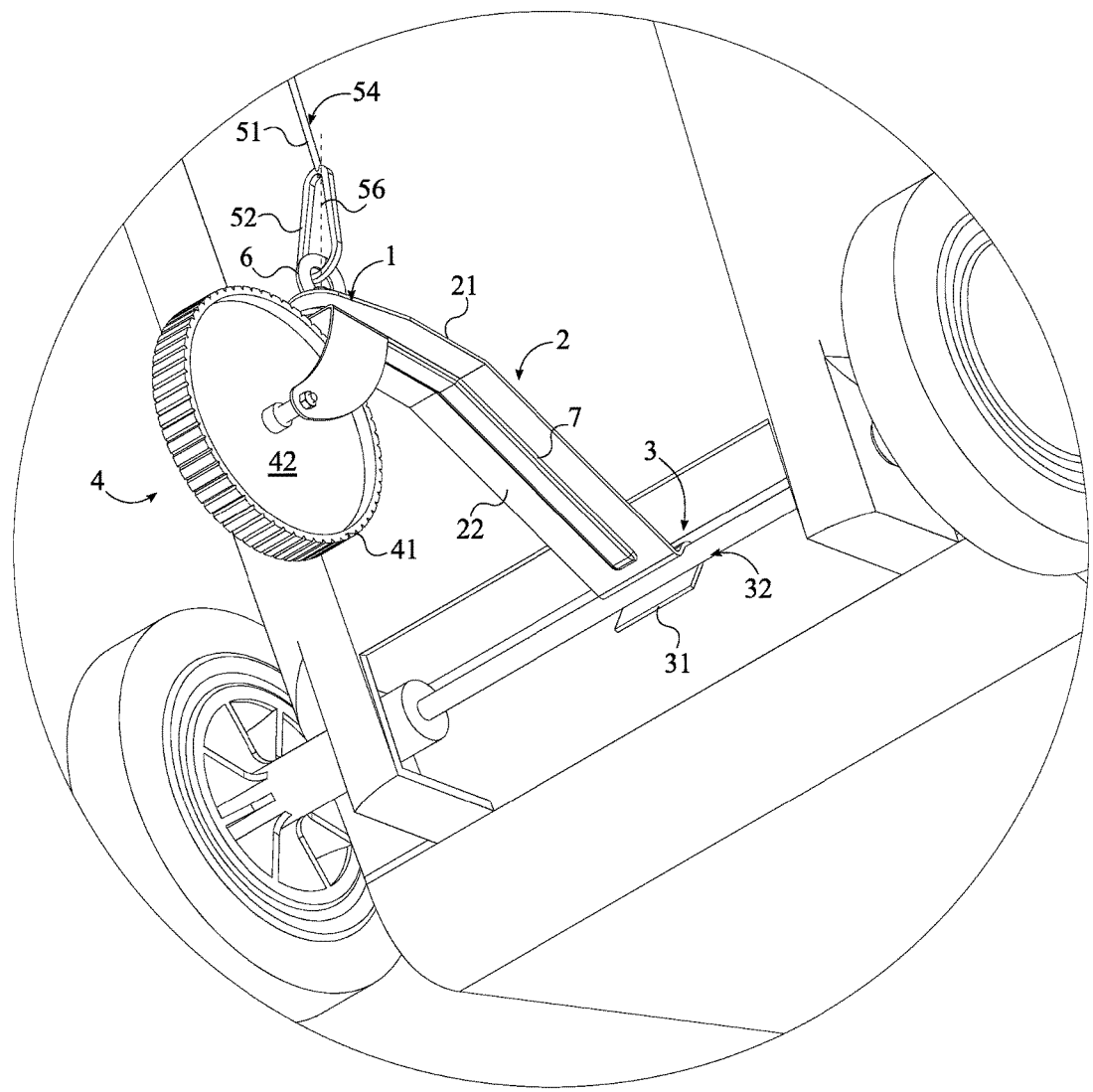
FIG. 6 is a detail view of circle 6 in FIG. 6 showing the connection between the C-shaped clamp of the and the wheel-and-axle assembly.

As can be seen in FIG. 6, the present invention is designed to retrofit onto any existing garbage bin. As such, the present invention utilizes a garbage-bin coupler 3. The garbage-bin coupler 3 enables present invention to be used with any existing wheeled garbage bin. The preferred embodiment of the garbage-bin coupler 3 is a C-shaped clamp 31. A snap fit between the C-shaped clamp 31 and the wheel-and-axle assembly selectively couples the extension plate 2 to the garbage bin. Further, the snap fit rotatably secures the extension plate 2 to the wheel-and-axle assembly. Preferably, the axle-receiving hole 32 of the C-shaped clamp 31 is positioned perpendicular to the pivot axis 56. Thus, the linear offset distance between the wheel 41 and axle 5 and the garbage bin is kept constant. The releasable nature of the C-shaped clamp 31 permits the user to use the present invention on a variety of different garbage bins. In alternate embodiments of the present invention, the garbage-bin coupler 3 may utilize similarly releasable fastening mechanism.

In reference to FIG. 1 and FIG. 3, the preferred wheel 41 comprises a tire 41 and a rim 42. The tire 41 is preferably composed of a high friction material such as rubber. Further, the tire 41 comprises a tread area 44 and a plurality of grooves 43. The tread area 44 is the flat portion of the tire 41 that contacts the ground. The plurality of grooves 43 increases the grip of the tread area 44, and prevents the tire 41 from losing traction and slipping on the ground. The tire 41 is concentrically mounted around the rim 42. Further, the tire 41 is also torsionally mounted to rim 42 which causes the rim 42 and the tire 41 to rotate at the same angular velocity. The rim 42 is rotatably mounted onto the axle 5. Preferably, the axle 5 and rim 42 are made of a metallic material with low coefficient of friction when pressed against each other. Thus, the rim 42 can freely rotate about the axle 5. In an alternate embodiment, a bearing may be used to connect the rim 42 to the wheel 41. In yet another embodiment, the axle 5 may be torsionally connected to the rim 42 whereas, the clevis 1 may be rotatably connected to the axle 5. The plurality of grooves 43 is distributed about the tread area 44. This positions the plurality of grooves 43 coincident to the ground, and helps the tire 41 gain traction in uneven terrain.

Figure 4:
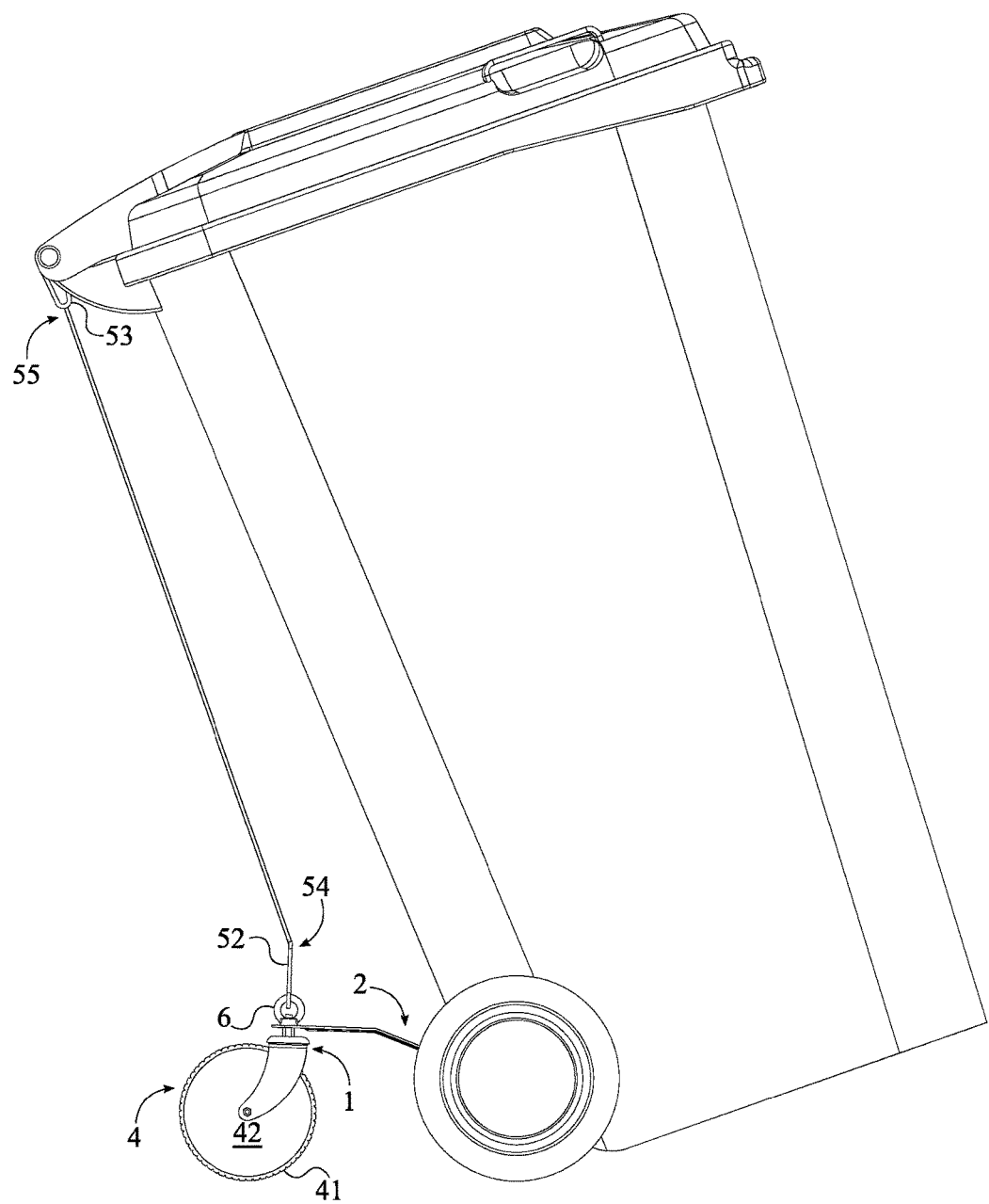
FIG. 4 is a side view of the present invention with the extension plate and the elastic cord mounted to the garbage bin.

Referring now to FIG. 4, the extension plate 2 is designed to laterally support the garbage bin in the tilted position. As such, the extension plate 2 comprises a first portion 21 and a second portion 22. The first portion 21 provides a retention point for the clevis 1. As such, the clevis 1 is positioned adjacent to the first portion 21. The second portion 22 is positioned adjacent to the first portion 21, opposite the clevis 1. This allows the garbage-bin coupler 3 to be positioned adjacent to the second portion 22, opposite the first portion 21. The first portion 21 is oriented at an obtuse angle 23 with the second portion 22. The first portion 21 is aligned horizontally level to allow the wheel 41 to maintain contact with the ground. In contrast, the second portion 22 is oriented at an angle in relation to the ground. The second portion 22 is designed to prevent the garbage bin from tilting too far back and tipping over. This allows the garbage bin to rest on the second portion 22 in a tilted position and physically restricts the garbage bin from tilting any further.

In reference to FIG. 6, to move the garbage bin forward or backward, the user must balance the load of the garbage bin on the wheel-and-axle assembly. In this case, the wheel-and-axle assembly acts as a fulcrum about which the center of gravity of the garbage bin can pivot. For maximal stability, the center of gravity of the garbage bin must be placed directly over the wheel-and-axle assembly. Since the wheel-and-axle assemblies for most garbage bins are positioned horizontally offset from the center, the garbage bin must be tilted backwards for maximal stability. Depending on the load characteristics of the garbage bin, the tilt angle required to balance the weight of the garbage bin may change but in all cases the garbage bin must be tilted backwards. The user tilts the garbage bin accordingly by resting the back of the garbage bin on the second portion 22 of the extension plate 2. Thus, the second portion 22 physically restricts the garbage bin from tilting further than the tilt angle allowed by the obtuse angle 23 between the first portion 21 of the extension plate 2 and the second portion 22. Additionally, the garbage-bin coupler 3 is not torsionally fixed onto the axle 5 but rather allows the extension plate 2 to freely rotate about the wheel-and-axle assembly. The rotatable engagement between the garbage bin and the extension plate 2 permits the user to tilt the garbage bin forward as may be necessary to empty its contents.

Referring back to FIG. 3, in the preferred embodiment of the present invention, the obtuse angle 23 is 150 degrees. This corresponds to a 30-degree tilt angle for the garbage bin. The specific obtuse angle 23 may change in alternate embodiments according to the tilt angle of the garbage bin. For example, for a 35-degree tilt angle, the obtuse angle 23 must be 145 degrees to ensure the first portion 21 remains horizontally level.

Figure 5:
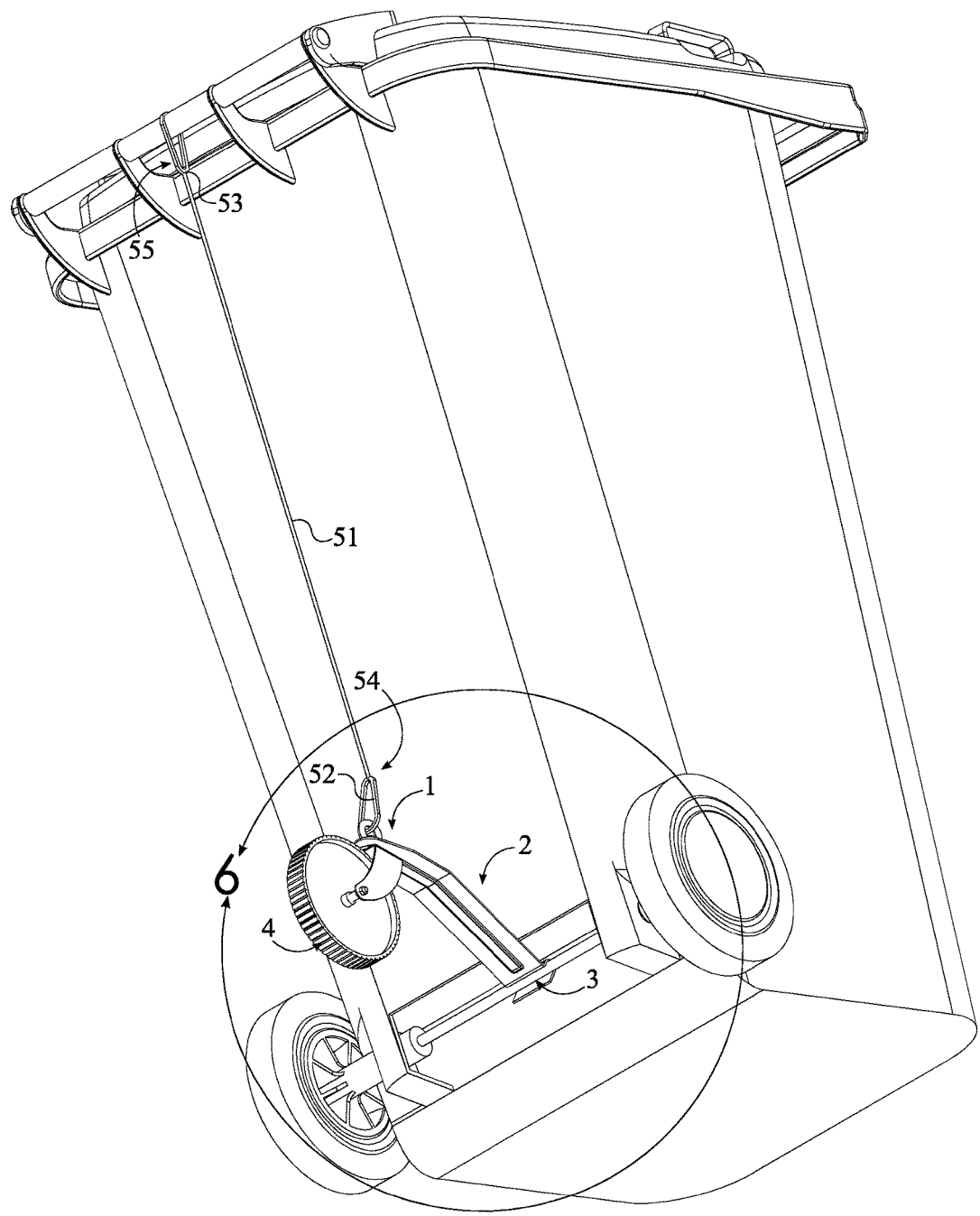
FIG. 5 is a bottom perspective view of the present invention illustrating the connection between the garbage-bin coupler and the garbage bin.

Referring back to FIG. 5 and FIG. 6, an elastic cord 51 helps secure the extension plate 2 to the garbage bin. The elastic cord 51 prevents the extension plate 2 from getting dislodged from the wheel-and-axle assembly when traveling over rough or uneven terrain. The preferred embodiment of the elastic cord 51 is a highly stretchable bungee cord. The elastic cord 51 is hooked to an eye 6 at one end and the hinge of the cover of the garbage bin at the other. In the preferred embodiment, the eye 6 is positioned adjacent to the pivot axis 56. More specifically, the eye 6 is integrated into the nut that screws into the threaded stem. The extension plate 2 is clamped between the nut on one side and the swivel head on the opposite side. Thus, the eye 6 is laterally connected onto the extension plate 2. Once the eye 6 is secured to the extension plate 2, a first cord end 54 of the elastic cord 51 is coupled to the eye 6. A second cord end 55 is preferably coupled to the hinge that attaches the cover to the body of the garbage bin. Alternately, the second cord end 55 may be attached at the farthest available point from the wheel-and-axle assembly. Attaching the first cord end 54 and the second cord end 55 at opposite ends of the garbage bin places the elastic cord 51 under tension, thereby pulling the extension plate 2 towards and the garbage bin cover. As a result, the elastic cord 51 forces the second portion 22 of the extension plate 2 to remain pressed against the garbage bin.

A first hook 52 and a second hook 53 allows the elastic cord 51 to selectively latch onto the garbage bin cover and the extension plate 2. In the preferred embodiment, both the first hook 52 and the second hook 53 are snap hooks. As such, the user may connect or disconnect the first hook 52 and the second hook 53 from the garbage been as required. The first hook 52 is fixed to the first cord end 54 of the elastic cord 51. Further, the first hook 52 is engaged to the eye 6. More specifically, the first hook 52 forms an interlocking engagement with the eye 6, thereby connecting the elastic cord 51 to the extension plate 2. Similarly, the second hook 53 is fixed to a second cord end 55 of the elastic cord 51. This positions the second hook 53 opposite the first hook 52 along the elastic cord 51. The second hook 53 interlocks with the hinge for the garbage bin cover. The first hook 52 and the second hook 53 are selectively latched to the eye 6 and the hinge of garbage bin cover to permit the user to tilt the garbage bin forward. This may be necessary to empty the contents of the garbage bin. Alternately any hooking or latching mechanism may be used to secure the elastic cord 51 to the garbage bin.

Finally, the extension plate 2 is fashioned with a structural rib 7 for added rigidity and structural integrity. The structural rib 7 is aligned longitudinally to the extension plate 2. This increases rigidity along the length of the extension plate 2 and prevents the extension plate 2 from bending from the pulling force of the elastic cord 51.

Although the invention has been explained in relation to its preferred embodiment, it is to be understood that many other possible modifications and variations can be made without departing from the spirit and scope of the invention as hereinafter claimed.

What is claimed is:

1. An attachable stabilizer for laterally supporting a garbage bin comprises:
    a clevis;
    an extension plate;
    a garbage-bin coupler;
    a wheel;
    an axle;
    the wheel being positioned into the clevis;
    the wheel being rotatably mounted to the clevis by the axle;
    the clevis being terminally positioned to the extension plate;
    the clevis being pivotally attached to the extension plate about a pivot axis;
    the pivot axis being positioned perpendicular to the axle;
    the garbage-bin coupler being terminally attached to the extension plate, opposite to the clevis;
    a cord;
    an eye;
    the eye being positioned adjacent to the pivot axis;
    the eye being laterally connected onto the extension plate; and
    a first cord end of the cord being coupled to the eye.

2. The attachable stabilizer for laterally supporting a garbage bin as claimed in claim 1 comprises:
    the clevis comprises a first sidewall, a second sidewall, and a bridge;
    the first sidewall and the second sidewall being positioned parallel and offset from each other;
    the bridge being connected in between the first sidewall and the second sidewall;
    the axle being attached in between the first sidewall and the second sidewall; and
    the bridge and the axle being positioned offset from each other along the clevis.

3. The attachable stabilizer for laterally supporting a garbage bin as claimed in claim 2, wherein the extension plate being centrally and pivotally attached to the bridge about the pivot axis.

4. The attachable stabilizer for laterally supporting a garbage bin as claimed in claim 1 comprises:
    the garbage-bin coupler being a C-shaped clamp; and
    an axle-receiving hole of the C-shaped clamp being positioned perpendicular to the pivot axis.

5. The attachable stabilizer for laterally supporting a garbage bin as claimed in claim 1 comprises:
    the wheel comprises a tire and a rim;
    the tire comprises a tread area and a plurality of grooves;
    the tire being concentrically mounted around the rim;

the rim being rotatably mounted onto the axle; and
the plurality of grooves being distributed about the tread area.

6. The attachable stabilizer for laterally supporting a garbage bin as claimed in claim 1 comprises:
the extension plate comprises a first portion and a second portion;
the clevis being positioned adjacent to the first portion;
the second portion being positioned adjacent to the first portion, opposite the clevis;
the garbage-bin coupler being positioned adjacent to the second portion, opposite the first portion; and
the first portion being oriented at an obtuse angle with the second portion.

7. The attachable stabilizer for laterally supporting a garbage bin as claimed in claim 6, wherein the obtuse angle is 150 degrees.

8. The attachable stabilizer for laterally supporting a garbage bin as claimed in claim 1 comprises:
the cord being an elastic cord.

9. The attachable stabilizer for laterally supporting a garbage bin as claimed in claim 8 comprises:
a first hook;
a second hook;
the first hook being fixed to the first cord end;
the first hook being engaged to the eye; and
the second hook being fixed to a second cord end of the elastic cord.

10. The attachable stabilizer for laterally supporting a garbage bin as claimed in claim 1 comprises:
a structural rib; and
the structural rib being integrated along the extension plate.

11. An attachable stabilizer for laterally supporting a garbage bin comprises:
a clevis;
an extension plate;
a garbage-bin coupler;
a wheel;
an axle;
the extension plate comprises a first portion and a second portion;
the wheel being positioned into the clevis;
the wheel being rotatably mounted to the clevis by the axle;
the clevis being terminally positioned to the extension plate;
the clevis being pivotally attached to the extension plate about a pivot axis;
the pivot axis being positioned perpendicular to the axle;
the garbage-bin coupler being terminally attached to the extension plate, opposite to the clevis;
the clevis being positioned adjacent to the first portion;
the second portion being positioned adjacent to the first portion, opposite the clevis;
the garbage-bin coupler being positioned adjacent to the second portion, opposite the first portion;
the first portion being oriented at an obtuse angle with the second portion;
a cord;
an eye;
the eye being positioned adjacent to the pivot axis;
the eye being laterally connected onto the extension plate; and
a first cord end of the cord being coupled to the eye.

12. The attachable stabilizer for laterally supporting a garbage bin as claimed in claim 11 comprises:
the clevis comprises a first sidewall, a second sidewall, and a bridge;
the first sidewall and the second sidewall being positioned parallel and offset from each other;
the bridge being connected in between the first sidewall and the second sidewall;
the axle being attached in between the first sidewall and the second sidewall; and
the bridge and the axle being positioned offset from each other along the clevis.

13. The attachable stabilizer for laterally supporting a garbage bin as claimed in claim 12, wherein the extension plate being centrally and pivotally attached to the bridge about the pivot axis.

14. The attachable stabilizer for laterally supporting a garbage bin as claimed in claim 11 comprises:
the garbage-bin coupler being a C-shaped clamp; and
an axle-receiving hole of the C-shaped clamp being positioned perpendicular to the pivot axis.

15. The attachable stabilizer for laterally supporting a garbage bin as claimed in claim 11, wherein the obtuse angle is 150 degrees.

16. The attachable stabilizer for laterally supporting a garbage bin as claimed in claim 11 comprises:
the cord being an elastic cord.

17. The attachable stabilizer for laterally supporting a garbage bin as claimed in claim 16 comprises:
a first hook;
a second hook;
the first hook being fixed to the first cord end;
the first hook being engaged to the eye; and
the second hook being fixed to a second cord end of the elastic cord.

18. The attachable stabilizer for laterally supporting a garbage bin as claimed in claim 11 comprises:
a structural rib; and
the structural rib being integrated along the extension plate.

* * * * *